(12) United States Patent
Beckman et al.

(10) Patent No.: US 9,964,966 B1
(45) Date of Patent: May 8, 2018

(54) CONTROLLING MECHANICAL VIBRATIONS

(71) Applicant: Amazon Technologies, Inc., Seattle, WA (US)

(72) Inventors: Brian C. Beckman, Newcastle, WA (US); Scott A. Green, North Bend, WA (US)

(73) Assignee: Amazon Technologies, Inc., Seattle, WA (US)

( * ) Notice: Subject to any disclaimer, the term of this patent is extended or adjusted under 35 U.S.C. 154(b) by 215 days.

(21) Appl. No.: 14/867,347

(22) Filed: Sep. 28, 2015

(51) Int. Cl.
| | | |
|---|---|---|
| *G01C 23/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *B64C 27/08* | (2006.01) |
| *G05D 19/00* | (2006.01) |
| *B64C 39/02* | (2006.01) |
| *B64C 27/00* | (2006.01) |
| *B23P 19/00* | (2006.01) |

(52) U.S. Cl.
CPC ........... *G05D 19/00* (2013.01); *B64C 27/001* (2013.01); *B64C 27/08* (2013.01); *B64C 39/024* (2013.01); *B64C 2027/002* (2013.01); *B64C 2027/004* (2013.01)

(58) Field of Classification Search
CPC ...... G05D 19/00; B64C 27/001; B64C 27/08; B64C 34/024
USPC .............................. 703/3; 244/17.23; 29/739
See application file for complete search history.

(56) References Cited

U.S. PATENT DOCUMENTS

| | | | |
|---|---|---|---|
| 2003/0041447 A1* | 3/2003 | Jacques ................. | F16F 15/005 29/739 |
| 2009/0283629 A1* | 11/2009 | Kroetsch ................ | A63H 27/12 244/17.23 |
| 2015/0336671 A1* | 11/2015 | Winn .................... | B64C 39/024 701/3 |
| 2016/0311527 A1* | 10/2016 | Poster .................... | B64C 27/12 |

* cited by examiner

*Primary Examiner* — Mahmoud S Ismail
(74) *Attorney, Agent, or Firm* — Athorus, PLLC

(57) ABSTRACT

Mechanical vibrations are generated on a frame of an aerial vehicle as a response to operation of the aerial vehicle, such as rotation of motors and/or propellers. Likewise, environmental conditions, such as wind, humidity, etc., may also cause vibrations on the frame of aerial vehicles. These vibrations may be destructive to the aerial vehicle, impact stability of the aerial vehicle, and/or result in audible sounds. Disclosed are systems and methods for measuring and/or predicting the vibrations on the frame of the aerial vehicle, generating anti-vibrations, and outputting those anti-vibrations such that the anti-vibrations modify vibrations on the frame of the aerial vehicle.

19 Claims, 13 Drawing Sheets

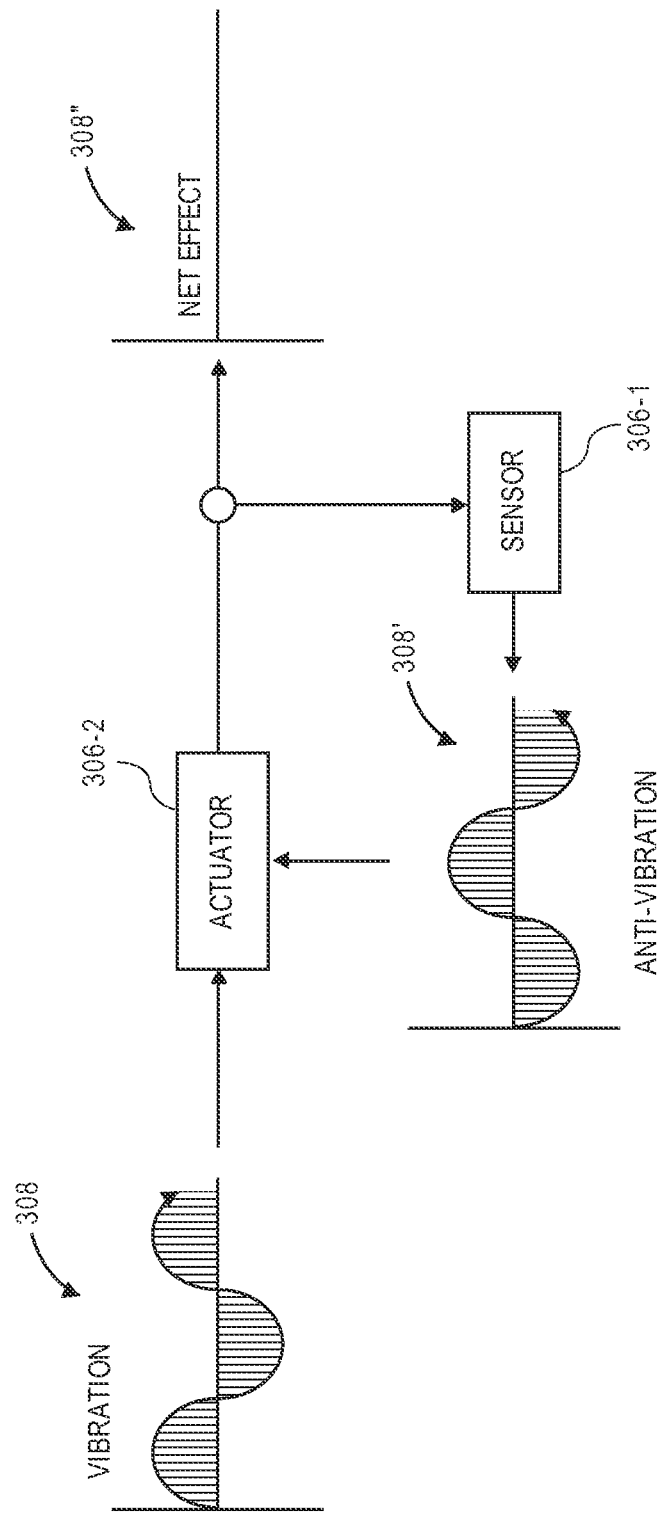

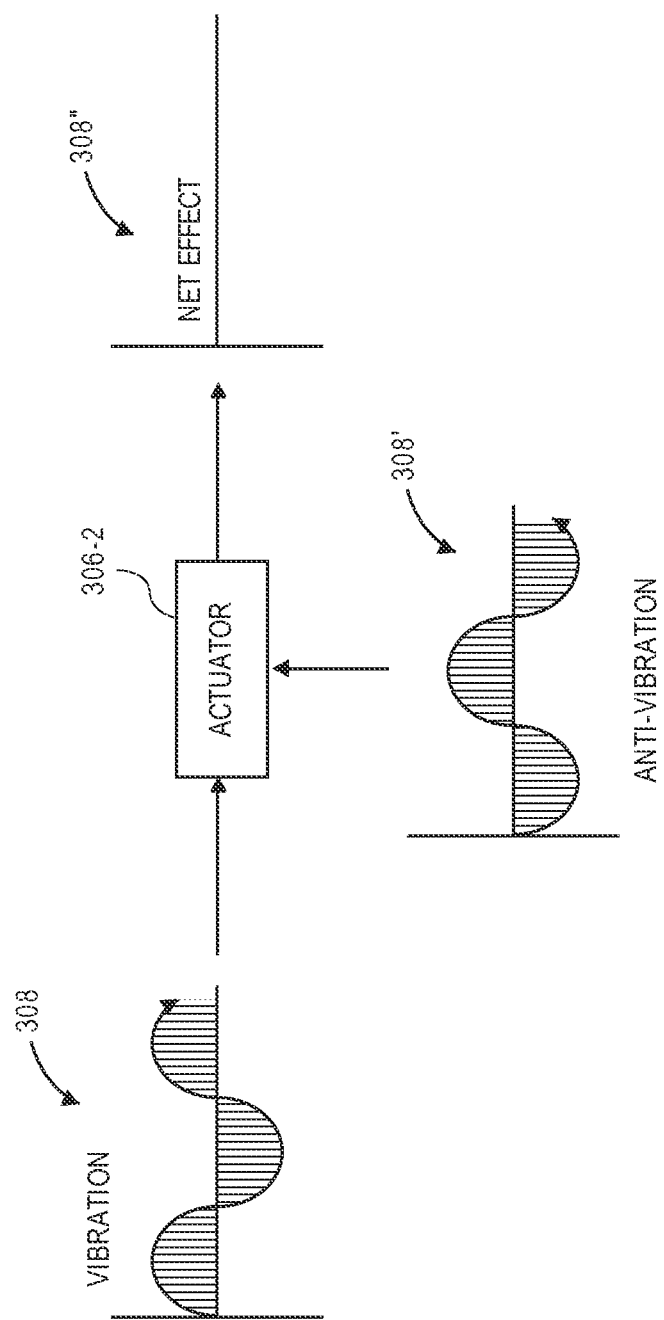

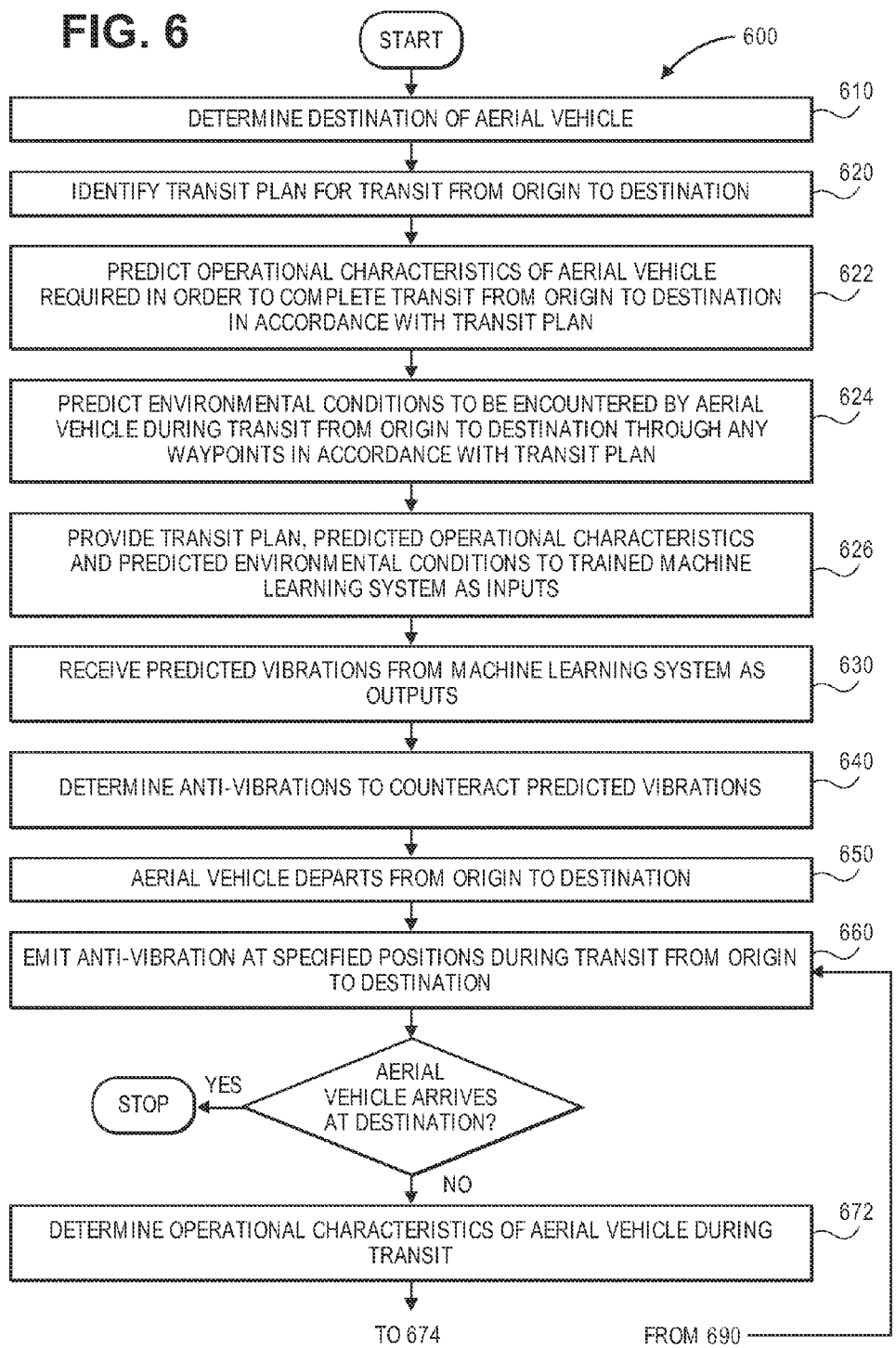

US 9,964,966 B1

CONTROLLING MECHANICAL VIBRATIONS

BACKGROUND

Vehicle traffic around residential areas continues to increase. Historically, vehicle traffic around homes and neighborhoods was primarily limited to automobile traffic. However, the recent development of aerial vehicles, such as unmanned aerial vehicles, has resulted in a rise of other forms of vehicle traffic. For example, hobbyists may fly unmanned aerial vehicles in and around neighborhoods, often within a few feet of a home. Likewise, there is discussion of electronic-commerce retailers, and other entities, delivering items directly to a user's home using unmanned aerial vehicles. As a result, such vehicles may be invited to navigate into a backyard, near a front porch, balcony, patio, and/or other locations around the residence to complete delivery of the package.

BRIEF DESCRIPTION OF THE DRAWINGS

FIGS. 3A-3D are block diagrams illustrating active airborne mechanical vibration control, according to an implementation.

DETAILED DESCRIPTION

Figure 1:
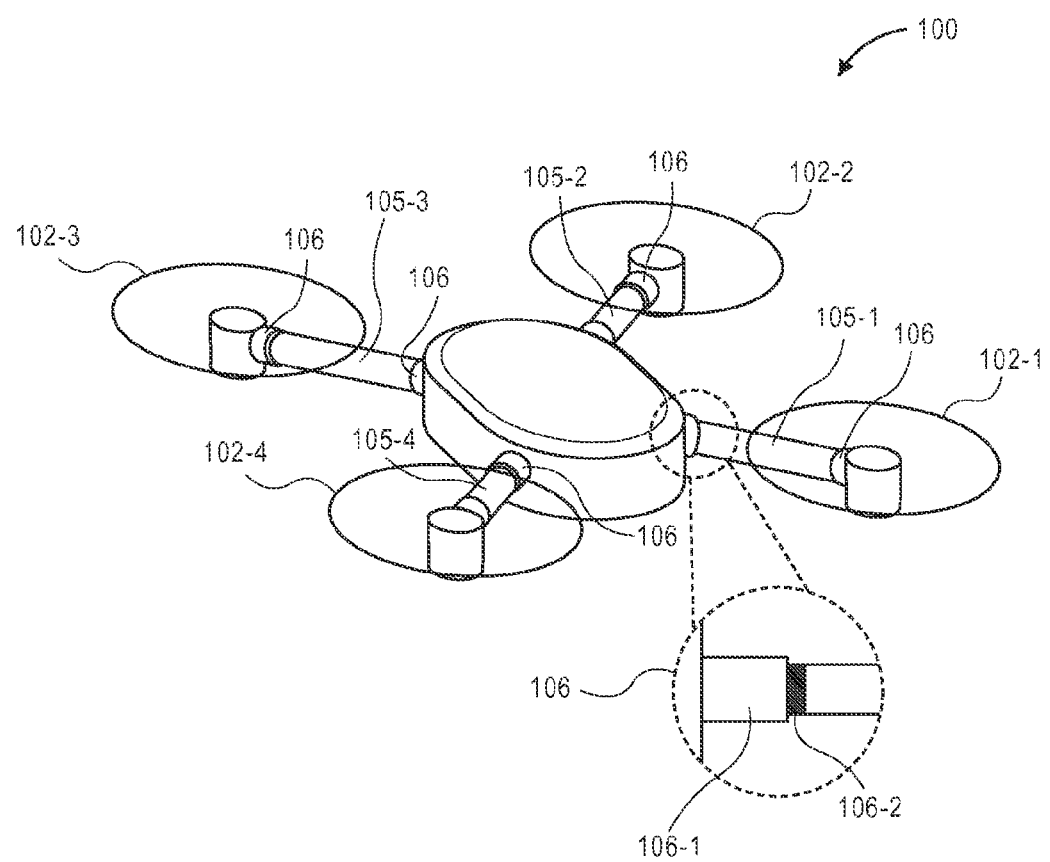
FIG. 1 is a view of an aerial vehicle configured for active mechanical vibration control, according to an implementation.

The present disclosure is directed to actively controlling mechanical vibrations in an aerial vehicle, such as a UAV, while the vehicle is airborne. For example, vibration sensors may be positioned at joints between structural members of a frame of an aerial vehicle and/or at other locations on the body of the aerial vehicle. The vibration sensors measure vibrations that occur at that location on the body of the aerial vehicle while the aerial vehicle is airborne. The measured vibrations may then be used to generate anti-vibrations that are output at or near the same location that will modify out measured vibrations. For example, the anti-vibrations may effectively cancel out our reduce the measured vibrations, modify the measured vibrations so they are less destructive to the aerial vehicle, modify the measured vibrations so that sound generated by the vibrations is more desirable to the surrounding environment, etc. As used herein, to modify a vibration is intended to refer to any change, cancellation, reduction, or other modification of the vibration.

By modifying vibrations, the overall aerial vehicle is stabilized as a result of a total vibration reduction, the aerial vehicle generates less noise, and the aerial vehicle will have an increased longevity because the components of the aerial vehicle are subject to fewer destructive forces. In some implementations, the measured vibrations may be recorded with other operational and/or environmental data. Such information or data may include, but is not limited to, extrinsic information or data, e.g., information or data not directly relating to the aerial vehicle, or intrinsic information or data, e.g., information or data relating to the aerial vehicle itself.

For example, extrinsic information or data may include, but is not limited to, environmental conditions (e.g., temperature, pressure, humidity, wind speed, and wind direction), times of day or days of a week, month or year when an aerial vehicle is operating, measures of cloud coverage, sunshine, surface conditions or textures (e.g., whether surfaces are wet, dry, covered with sand or snow or have any other texture) within a given environment, a phase of the moon, ocean tides, the direction of the earth's magnetic field, a pollution level in the air, a particulates count, or any other factors within the given environment. Intrinsic information or data may include, but is not limited to, operational characteristics (e.g., dynamic attributes such as altitudes, courses, speeds, rates of climb or descent, turn rates, or accelerations; or physical attributes such as dimensions of structures or frames, numbers of propellers or motors, operating speeds of such motors) or tracked positions (e.g., latitudes and/or longitudes) of the aerial vehicles. In accordance with the present disclosure, the amount, the type and the variety of information or data that may be captured regarding the physical or operational environments in which aerial vehicles are operating and correlated with information or data regarding measured vibrations is theoretically unbounded.

The extrinsic information or data and/or the intrinsic information or data captured by aerial vehicles during flight may be used to train a machine learning system to associate an aerial vehicle's operations or locations, or conditions in such locations, with vibrations acting upon the aerial vehicle. The trained machine learning system, or a vibration model developed using such a trained machine learned system, may then be used to predict vibrations that may be expected at various joints of the aerial vehicle when an aerial vehicle operates in a predetermined location, or subject to a predetermined set of conditions, at given velocities or positions, or in accordance with any other characteristics. Once such vibrations are predicted, anti-vibrations, or vibrations having substantially identical acceleration (m/s$^2$), velocity (mm/s), displacement (mm), or frequency (Hz) that are out-of-phase with the predicted vibrations (e.g., having polarities that are reversed with respect to polarities of the predicted vibrations), may be determined, and subsequently output by actuators at the joints during airborne operation of the aerial vehicle. When the anti-vibrations are output at the joints, such anti-vibrations effectively modify the effects of some or all of the predicted vibrations at those locations on the body of the aerial vehicle. In this regard, the systems and methods described herein may be utilized to effectively control the vibrations acting on various members of the aerial vehicle.

FIG. 1 is a view of an aerial vehicle 100 configured for active mechanical vibration control at different locations on the body 104 of the aerial vehicle, according to an implementation. As illustrated in FIG. 1, the aerial vehicle 100 includes four propellers 102-1, 102-2, 102-3, 102-4 powered by propeller motors and spaced about a body 104 of the aerial vehicle as part of a propulsion system. A control system (not shown), which may be positioned within the body 104 is utilized for controlling the propeller motors for flying the aerial vehicle 100, as well as controlling other operations of the aerial vehicle 100.

The motors and propellers 102 may be of any type and of a size sufficient to lift the aerial vehicle 100 and any items engaged by the aerial vehicle 100 so that the aerial vehicle 100 can navigate through the air, for example, to deliver an item to a location. In one implementation, for the purpose of item transport, the propeller motors may each be a FX-4006-13 740 kv multi rotor motor, and the propellers may be made of one or more suitable materials, such as graphite, carbon fiber, etc. While the example of FIG. 1 includes four motors and propellers, in other implementations, more or fewer motors and/or propellers may be utilized for the propulsion system of the aerial vehicle 100. Likewise, in some implementations, the motors and/or propellers may be positioned at different locations and/or orientations on the aerial vehicle 100. In addition, alternative methods of propulsion may be utilized. For example, engines, fans, jets, turbojets, turbo fans, jet engines, and the like may be used to propel the aerial vehicle.

The body 104 or frame of the aerial vehicle 100 may be of any suitable material, such as graphite, carbon fiber, and/or aluminum. In this example, the body 104 of the aerial vehicle 100 includes four motor arms 105-1, 105-2, 105-3, and 105-4 that are coupled to and extend from the body 104 of the aerial vehicle 100. The propellers 102 and corresponding propeller motors are positioned at the ends of each motor arm 105. In some implementations, all of the motor arms 105 may be of approximately the same length while, in other implementations, some or all of the motor arms may be of different lengths. Likewise, the spacing between the two sets of motor arms may be approximately the same or different.

A mechanical vibration control system 106 is included at some or all of the joints between the different members of the aerial vehicle. For example, a mechanical vibration control system 106 may be included at one or more of the joints between the motor arms 105 and the body 104 and/or at the joints between the motor arms 105 and the motors. Likewise, if the aerial vehicle 100 includes other joints between members of the aerial vehicle, such as between the body 104 and a gimbal, a mechanical vibration control system may be included.

Depending on the configuration, the mechanical vibration control system 106 may include a sensor configured to measure vibrations at the joint and/or an actuator configured to generate output vibrations, referred to herein as anti-vibrations at the joint. In some implementations, a single component may operate as both a sensor and an actuator. In other implementations, separate components may be used to sense vibrations and output vibrations. In still other implementations, the mechanical vibration control system 106 may only include an actuator that generates anti-vibrations. For example, referring to the expanded view, the mechanical vibration control system 106 may include an actuator 106-1 and a sensor 106-2.

The sensors 106-2 may be any type of sensor that can measure one or more aspects (acceleration, velocity, displacement, frequency) of a vibration at a joint or another location on the body of the aerial vehicle 100. For example, a sensor may be a piezoelectric accelerometer, a load cell (e.g., strain gauge, hydraulic, pneumatic), a microphone, an electromagnetic sensor, or any other type of sensor that can measure vibratory motion into an electrical signal.

Vibration may be described as a motion of an object, such as a structural member, about a reference position, such as a joint. The number of times a complete motion cycle of the object takes place during a period of one second is called the frequency of the vibration and is measured in hertz (Hz). Vibration can include a single component occurring at a single frequency or several components occurring at different frequencies. The displacement is the physical movement of the object to either side of the reference position. For sinusoidal signals, displacement, velocity, and acceleration amplitudes are related mathematically by a function of frequency and time. The amplitude of a vibration, which represents the severity of the vibration, can be determined as peak-to-peak value, a peak value, an average value, and/or an RMS value for the vibration. In some implementations, the RMS value is determined as it factors in both the time history of the vibration and the amplitude of the vibration that is directly related to the energy content and the destructive abilities of the vibration.

In addition to a sensor, the mechanical vibration control system 106 may also include an actuator 106-1. The actuator may be any type of device that can convert an electrical signal into a physical or haptic output that has a frequency and an amplitude. In some implementations, both the sensor 106-2 and the actuator 106-1 may be piezoelectric accelerometers. In other implementations, a single piezoelectric accelerometer may be used as both the sensor and the actuator. In sensor mode, the piezoelectric accelerometer may be self-generating. A piezoelectric material, such as artificially polarized ferroelectric ceramic, when mechanically stressed, either in tension, compression, or shear, generates an electrical charge across its pole faces that are proportional to the force applied to the sensor. This electrical charge is representative of the vibration occurring at the joint.

To operate the piezoelectric accelerometer as an actuator, an input, such as an electrical charge, signal, current, voltage, etc. from a source is presented to the poles of the piezoelectric material that causes the material to generate an output force that is proportional to the applied input. As discussed below, the anti-vibration may be the measured vibration, represented as the input generated across the poles of the piezoelectric material, shifted 180 degrees out of phase.

By measuring vibrations and outputting anti-vibrations at each joint or other location on the body of the aerial vehicle 100, the measured vibrations and anti-vibrations at each joint or other location are independent. Accordingly, each mechanical vibration control system 106 may operate independent of other mechanical vibration control systems 106 of the aerial vehicle 100 and each may include its own processing and/or memory for operation. Alternatively, two or more sensors and/or actuators of the mechanical vibration control systems 106 of an aerial vehicle may be controlled by a single controller. For example, the mechanical vibration control systems included at the joints of the motor arm 105-1 may both be controlled by a single controller. Alternatively, a single controller on the aerial vehicle may control all of the mechanical vibration control systems 106 of the aerial vehicle 100.

While the implementations of the aerial vehicle discussed herein utilize propellers to achieve and maintain flight, in other implementations, the aerial vehicle may be configured in other manners. For example, the aerial vehicle may include fixed wings and/or a combination of both propellers and fixed wings. In such configurations, the aerial vehicle may utilize one or more propellers to enable takeoff and landing and a fixed wing configuration or a combination wing and propeller configuration to sustain flight while the aerial vehicle is airborne. In some implementations, one or more of the propulsion mechanisms (e.g., propellers and motors) may have a variable axes such that it can rotate between vertical and horizontal orientations.

Figure 2:
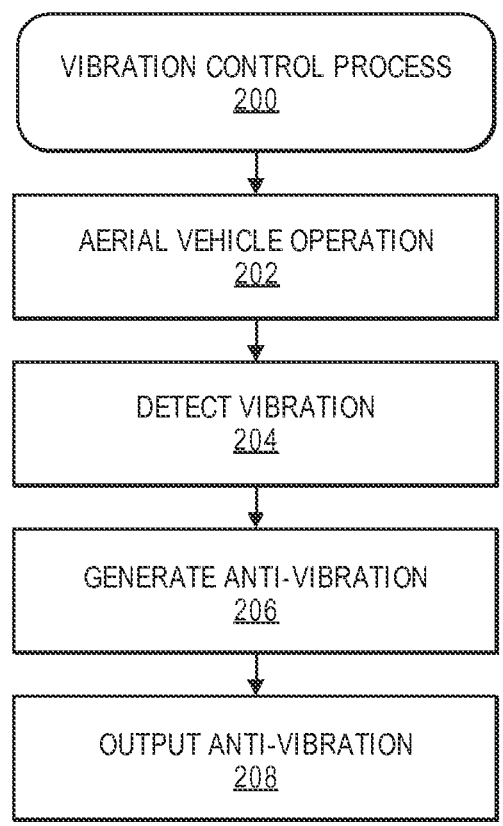
FIG. 2 is a flow diagram illustrating an example process for active airborne mechanical vibration control, according to an implementation.

FIG. 2 is a flow diagram illustrating an example process 200 for active mechanical vibration control, according to an implementation. This process, and each process described herein, may be implemented by the architectures described herein or by other architectures. The process is illustrated as a collection of blocks in a logical flow graph. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 200 may operate independently at each mechanical vibration control system of an aerial vehicle. The example process 200 begins when an aerial vehicle that includes one or more mechanical vibration control systems is operational, as in 202. In some implementations, the example process 200 may only operate when the aerial vehicle is airborne and/or the motors are rotating. In other implementations, the example process 200 may be active at any time in which the aerial vehicle is powered.

When the aerial vehicle is operational, a vibration is detected by a sensor of the mechanical vibration control system, as in 204. For example, a vibration sensor, such as a piezoelectric accelerometer, may detect and measure a vibration at a joint of the aerial vehicle at which the vibration sensor is positioned. Utilizing the vibration, an anti-vibration is generated, as in 206. For example, the anti-vibration may be the measured vibration with a 180 degree phase shift such that the anti-vibration is effectively an inverse of the measured vibration.

The generated anti-vibration is then output by an actuator, as in 208, which may be the same or separate from the vibration sensor, such that the anti-vibration modifies the measured vibration. Upon output of the anti-vibration and while the aerial vehicle is operational, the example process 200 returns to block 204 and continues. In implementations in which the vibration sensor and the actuator are the same device, the measuring and output may periodically alternate, as discussed further below with respect to FIG. 3A. In other implementations, a single device may be configured to measure vibrations and output anti-vibrations simultaneously. In implementations where the sensor and the actuator are separate components, the sensor may measure the vibration at the joint and provide those measurements in either a feed-forward or a feedback mode to the actuator, as discussed further below with respect to FIGS. 3B and 3C. In another implementation, the mechanical vibration control system may not include a sensor and may instead receive a predicted vibration and/or an anti-vibration corresponding to a predicted vibration, as discussed further below.

Figure 3A:
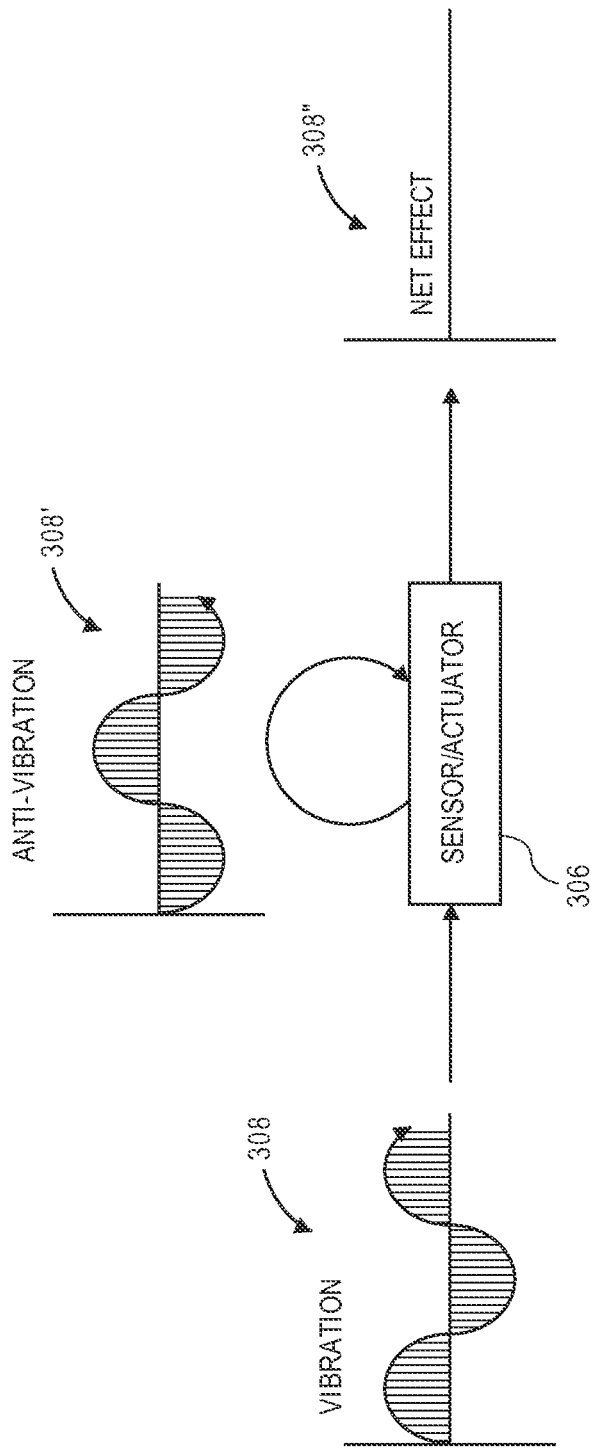

FIGS. 3A-3D are block diagrams illustrating active mechanical vibration control system configurations, according to an implementation. Turning first to FIG. 3A, illustrated is a block diagram in which the active mechanical vibration control system includes a single device 306 that functions as both a sensor for measuring a vibration and an actuator for outputting an anti-vibration that is based on the measured vibration. In such a configuration, a vibration 308 is measured by the device 306 during a first time while the device is operating as a sensor. The device 306 utilizes the measured vibration 308 to generate an anti-vibration 308', which may be the measured vibration phase shifted 180 degrees.

Upon completion of the first time, the mode of the device 306 changes so that the device operates as an actuator and the device outputs the anti-vibration 308' during a second time. The anti-vibration 308', when combined with the vibration 308, results in a net effect 308" of reduced or no vibration at the joint where the mechanical vibration control system is positioned. While the example illustrated in FIG. 3A shows a net effect 308" of no vibration, in some implementations, the vibration may only be reduced or partially suppressed such that the net effect 308" is a reduced vibration. In other implementations, the vibration may be otherwise modified. For example, rather than suppressing or just reducing the vibration, the anti-vibration may combine with the vibration to generate a net effect that results in an audible sound that is more desirable. During operation of the aerial vehicle, the device 306 may periodically switch between sensor mode and actuator mode so that the anti-vibration can be altered or adjusted to account for changes in the vibration. For example, the sensor may operate in a sensor mode for approximately ten milliseconds to measure vibrations and then operate in an actuator mode for approximately ten milliseconds to output anti-vibrations that are based on the measured vibrations. Switching between sensor mode and actuator mode approximately every ten milliseconds enables detection and creation of anti-vibrations up to at least 500 Hz. In other implementations, the switching mode may not be symmetric. For example, the sensor may operate in sensor mode for approximately ten milliseconds to measure vibrations and then operate in actuator mode for approximately twenty-five milliseconds to output anti-vibrations. Regardless of the period, the sensor may continue to switch between sensor mode and actuator mode so that the measured vibrations and corresponding anti-vibration can be updated.

Figure 3B:
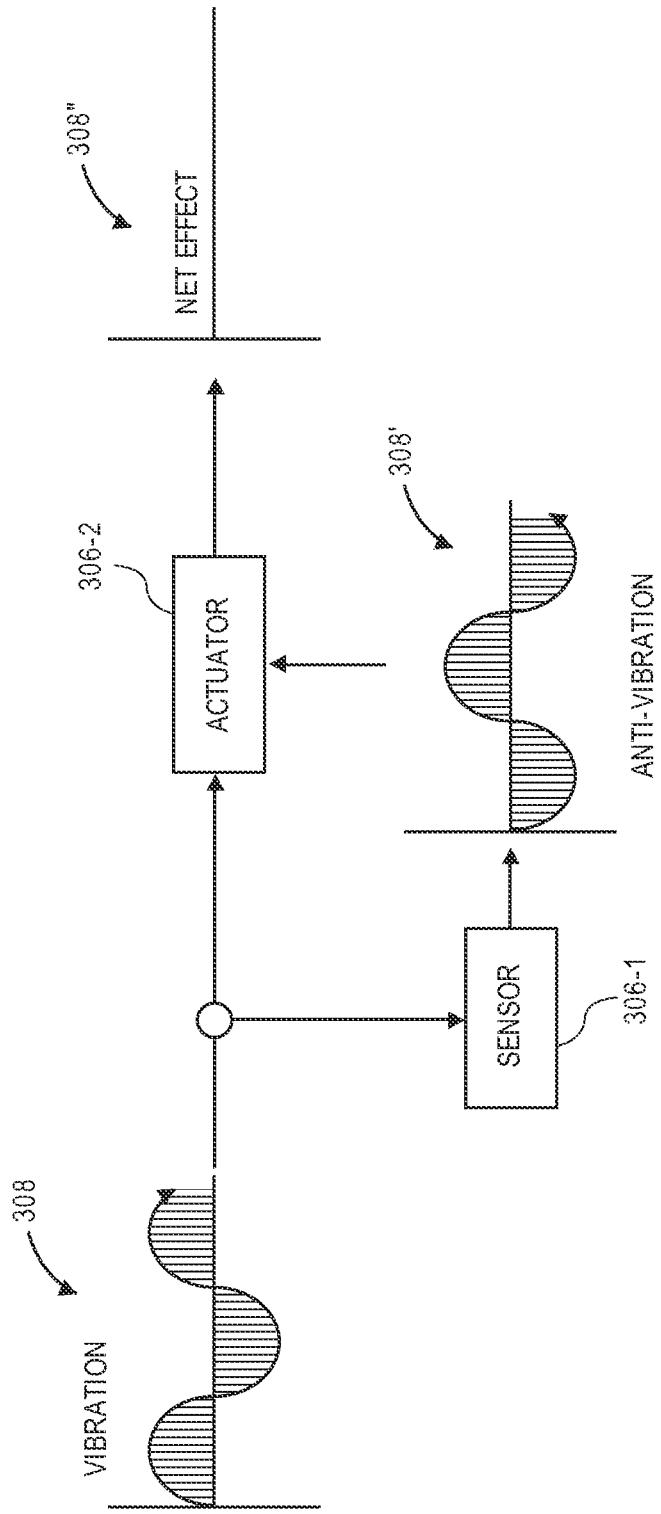

FIG. 3B illustrates a block diagram in which the active mechanical vibration control systems includes a sensor 306-1 and a separate actuator 306-2. In this illustrated configuration, the mechanical vibration control system utilizes a feed-forward control. In feed-forward, the sensor measures the vibration at the joint, generates an anti-vibration and provides, or feeds, that anti-vibration to the actuator. This is done without considering the net effect or output from the combined vibration and anti-vibration.

Upon receiving the anti-vibration, the actuator 306-2 outputs the anti-vibration at the joint. Similar to FIG. 3A, the anti-vibration 308', which may be the measured vibration phase shifted 180 degrees, when combined with the vibration 308, results in a net effect 308″ of reduced or no vibration at the joint where the mechanical vibration control system is positioned.

While the example illustrated in FIG. 3B describes that the sensor generates and provides the anti-vibration to the actuator 306-2, in other implementations, the sensor 306-1 may provide the measured signal to the actuator 306-2 and the actuator may generate and output the anti-vibration. Likewise, while the example illustrated in FIG. 3B shows a net effect 308″ of no vibration, in some implementations, the vibration may only be reduced or partially suppressed. During operation of the aerial vehicle, the operation of the sensor 306-1 and/or the actuator 306-2 may both be continuous. Alternatively, the operation of the sensor and the actuator may be periodic such that either the sensor is measuring or the actuator is generating an output.

FIG. 3C illustrates a block diagram in which the active mechanical vibration control system includes a sensor 306-1 and a separate actuator 306-2. In this illustrated configuration, the mechanical vibration control system utilizes a feedback control. In feedback, the sensor 306-1 measures the output or net effect 308″ resulting from a combination of the vibration 308 and the anti-vibration 308′ generated by the actuator 306-2 and generates an updated anti-vibration 308′ that is provided or fed-back to the actuator 306-2. With a feedback control, the net effect 308″ is considered and utilized to generate or update the anti-vibration 308′ that is provided to and output by the actuator 306-2. Upon receiving the anti-vibration, the actuator 306-2 outputs the anti-vibration at the joint.

While the example illustrated in FIG. 3C describes that the sensor generates and provides the anti-vibration to the actuator 306-2, in other implementations, the sensor 306-1 may provide the measured net effect 308″ to the actuator 306-2 and the actuator may generate and output the anti-vibration 308′. Likewise, while the example illustrated in FIG. 3C shows a net effect 308″ of no vibration, in some implementations, the vibration may only be reduced or partially suppressed. During operation of the aerial vehicle, the operation of the sensor 306-1 and/or the actuator 306-2 may both be continuous. Alternatively, the operation of the sensor and the actuator may be periodic such that either the sensor is measuring or the actuator is generating an output.

FIG. 3D illustrates a block diagram in which the active mechanical vibration control system only includes an actuator 306-2 and does not include a sensor. In this configuration, the anti-vibration may be determined based on a machine learned model that considers the operational and/or environmental conditions of the aerial vehicle. Based on the operational and/or environmental conditions, a predicted vibration is determined and a corresponding anti-vibration 308′ is provided to the actuator 306-2. Upon receiving the anti-vibration, the actuator 306-2 outputs the anti-vibration at the joint at which the mechanical vibration control system is positioned. Like the other examples, the vibration 308 and the output anti-vibration 308′ combine to produce a net effect 308″ that is either no vibration at the joint or a reduced vibration at the joint.

While the example illustrated in FIG. 3D describes that an anti-vibration signal is determined from a predicted vibration and provided to the actuator 306-2, in other implementations, the predicted vibration may be provided to the actuator 306-2 and the actuator may generate and output the anti-vibration 308′ based on the provided predicted vibration. Likewise, while the example illustrated in FIG. 3D shows a net effect 308″ of no vibration, in some implementations, the vibration may only be reduced or partially suppressed. In some implementations, the actuator 306-2 may continually output the anti-vibration until it receives additional instructions, such as another anti-vibration or an instruction to terminate output of an anti-vibration.

Referring to FIGS. 4A through 4D, views of aspects of one system 400 for active airborne mechanical vibration control in accordance with an implementation are shown. The illustration corresponding to FIGS. 4A-4D provides additional details of an example implementation for predicting an anti-vibration signal that may be provided to the actuator, as illustrated in FIG. 3D.

Figure 4A:
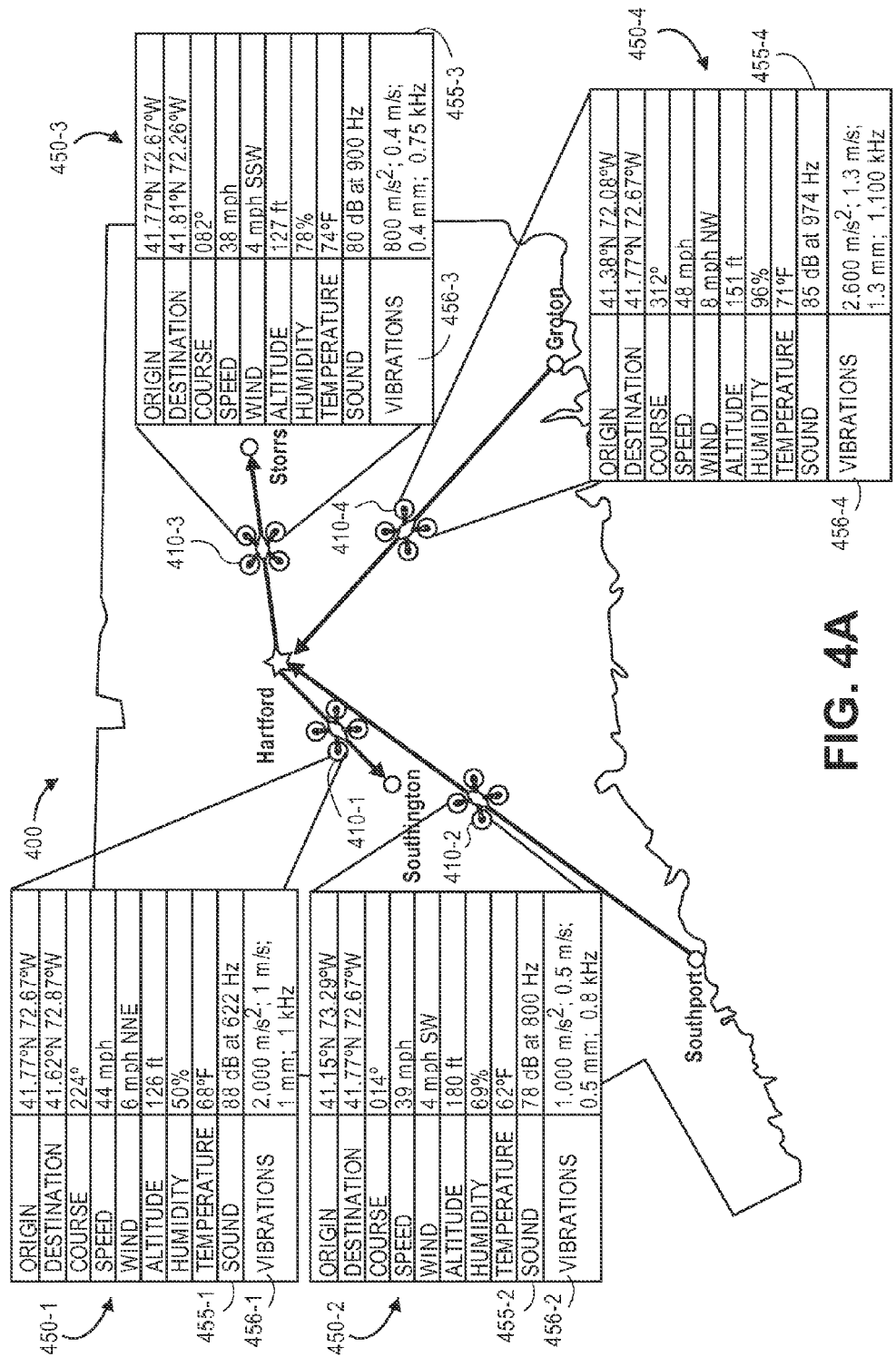
FIGS. 4A through 4D are views of aspects of one system for active airborne mechanical vibration control, according to an implementation.

FIG. 4A illustrates a plurality of aerial vehicles 410-1, 410-2, 410-3, 410-4 are engaged in flight between origins and destinations. For example, the aerial vehicle 410-1 is shown en route between Hartford, Conn., and Southington, Conn., while the aerial vehicle 410-2 is shown en route between Southport, Conn., and Hartford. The aerial vehicle 410-3 is shown en route between Groton, Conn., and Hartford, while the aerial vehicle 410-4 is shown en route between Hartford and Storrs, Conn. The aerial vehicles 410-1, 410-2, 410-3, 410-4 are configured to capture extrinsic or intrinsic information or data 450-1, 450-2, 450-3, 450-4 regarding the aerial vehicles 410-1, 410-2, 410-3, and 410-4 and the environments in which the aerial vehicles 410-1, 410-2, 410-3, 410-4 are operating, including but not limited to information or data regarding locations, altitudes, courses, speeds, climb or descent rates, turn rates, accelerations, wind velocities, humidity levels and temperatures, sounds, etc., using one or more sensors. The aerial vehicles 410-1, 410-2, 410-3, 410-4 are also configured to capture vibrations 456-1, 456-2, 456-3, and 456-4 at different joints or other locations on the body of the aerial vehicles during their respective flights.

For example, as is shown in the information or data 450-1 of FIG. 4A, the aerial vehicle 410-1 is traveling on a course of 224° and at a speed of 44 miles per hour (mph), in winds of 6 mph out of the north northeast, at an altitude of 126 feet, in air having 50 percent humidity and a temperature of 68 degrees Fahrenheit (° F.), and the sound measured around the aerial vehicle 410-1 is 88 decibels ("dB") at 622 Hz. The information or data 450-2 of FIG. 4A indicates that the aerial vehicle 410-2 is traveling on a course of 014° and at a speed of 39 mph, in winds of 4 mph out of the southwest, at an altitude of 180 feet, in air having 69 percent humidity and a temperature of 62° F., and that the sound around the aerial vehicle 410-2 is 78 dB at 800 Hz. The information or data 450-3 of FIG. 4A indicates that the aerial vehicle 410-3 is traveling on a course of 082° and at a speed of 38 mph, in winds of 4 mph out of the south southwest, at an altitude of 127 feet and in air having 78% humidity, a temperature of 74° F., and that the sound measured around the aerial vehicle 410-3 is 80 dB at 900 Hz. Finally, the information or data 450-4 of FIG. 4A indicates that the aerial vehicle 410-4 is traveling on a course of 312° and at a speed of 48 mph, in winds of 8 mph out of the northwest, at an altitude of 151 feet and in air having 96 percent humidity and a temperature of 71° F., and that the sound measured around the aerial vehicle 410-4 is 85 dB at 974 Hz.

Additionally, the information or data 456-1 indicates that a mechanical vibration control system at a joint on the aerial vehicle 410-1 has recorded vibrations at the joint having an acceleration of 2,000 meters per squared second ("m/s$^2$"), a velocity of 1 meter per second (m/s), a displacement of 1 mm, and a frequency of 1 kHz. The information or data 456-2 indicates that a mechanical vibration control system at a joint on the aerial vehicle 410-2 has recorded vibrations at the joint having an acceleration of 1,000 m/s$^2$, a velocity of 0.5 m/s, a displacement of 0.5 mm, and a frequency of 0.8 kHz. The information or data 456-3 indicates that a mechanical vibration control system at a joint on the aerial vehicle 410-3 has recorded vibrations at the joint having an acceleration of 800 m/s, a velocity of 0.4 m/s, a displacement of 0.4 mm, and a frequency of 0.75 kHz. The information or data 456-4 indicates that a mechanical vibration control system at a joint on the aerial vehicle 410-4 has recorded vibrations at the joint having an acceleration of 2,600 m/s$^2$, a velocity of 1.3 m/s, a displacement of 1.3 mm, and a frequency of 1,100 kHz. While the illustration in FIG. 4A only shows vibration measurements for a single location on the aerial vehicle, it will be appreciated that the information or data 456 may include recorded vibrations for each mechanical vibration control system that is positioned on each vehicle. For example, if aerial vehicle 410-1 includes eight mechanical vibration control systems, the data 456-1 may include vibration measurements for each of the eight mechanical vibration control systems included on the aerial vehicle 410-1.

Figure 4B:
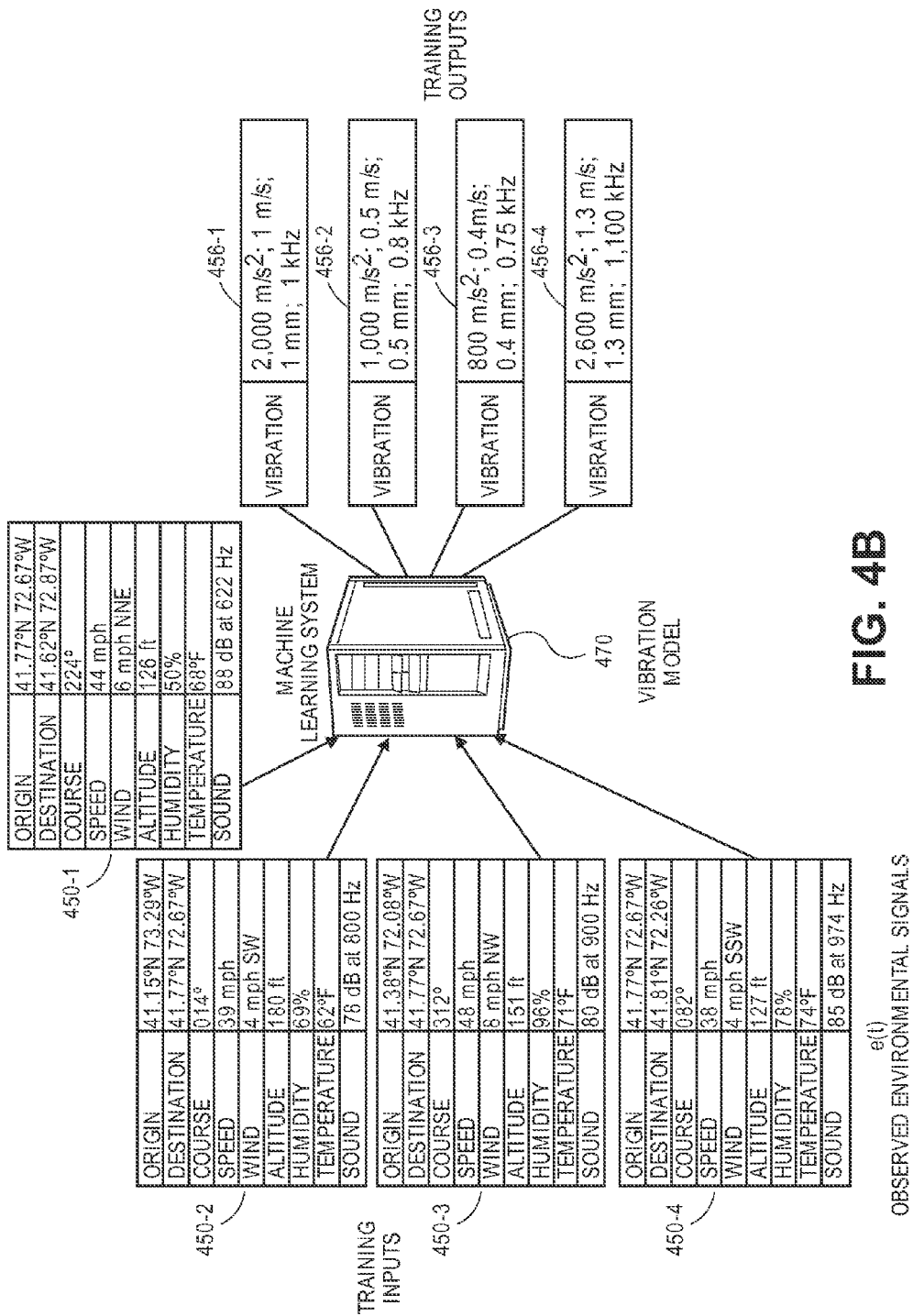

In accordance with the present disclosure, the aerial vehicles 410-1, 410-2, 410-3, 410-4 may be configured to provide both the extrinsic and intrinsic information or data 450-1, 450-2, 450-3, 450-4 (e.g., information or data regarding environmental conditions, operational characteristics or tracked positions of the aerial vehicles 410-1, 410-2, 410-3, 410-4), and also the information or data 456-1, 456-2, 456-3, 456-4 regarding the vibrations recorded during the transits of the aerial vehicles 410-1, 410-2, 410-3, 410-4, to a data processing system. The information or data 450-1, 450-2, 450-3, 450-4 and the information or data 456-1, 456-2, 456-3, 456-4 may be provided to the data processing system either in real time or in near-real time while the aerial vehicles 410-1, 410-2, 410-3, 410-4 are in transit, or upon their arrival at their respective destinations. Referring to FIG. 4B, the extrinsic and intrinsic information or data 450-1, 450-2, 450-3, 450-4, e.g., observed environmental signals e(t), is provided to a machine learning system 470 as a set of training inputs, and the information or data 456-1, 456-2, 456-3, 456-4, e.g., measured vibration data, regarding the vibrations recorded by each of the vibration sensors during the transits of the aerial vehicles 410-1, 410-2, 410-3, 410-4 is provided to the machine learning system 470 as a set of training outputs for each of the vibration control systems of the aerial vehicle. As discussed above, the vibration data will be included for each vibration control system of the aerial vehicle.

The machine learning system 470 may be fully trained using a substantial corpus of observed environmental signals e(t) correlated with measured vibrations that are obtained using each of the vibration control systems of one or more of the aerial vehicles 410-1, 410-2, 410-3, 410-4, and others, to develop vibration models for each vibration control system dependent on the location of the vibration control system on the aerial vehicles. After the machine learning system 470 has been trained, and the vibration models developed, the machine learning system 470 may be provided with a set of extrinsic or intrinsic information or data (e.g., environmental conditions, operational characteristics, or positions) that may be anticipated in an environment in which an aerial vehicle is operating or expected to operate and the machine learning system 470 will provide predicted vibrations for each vibration control system of the aerial vehicle. In some implementations, the machine learning system 470 may reside and/or be operated on one or more computing devices or machines provided onboard one or more of the aerial vehicles 410-1, 410-2, 410-3, and 410-4.

The machine learning system 470 may receive information or data regarding the corpus of vibration signals observed and the vibrations measured by vibration sensors of the other aerial vehicles 410-1, 410-2, 410-3, 410-4, for training purposes and, once trained, the machine learning system 470 may receive extrinsic or intrinsic information or data that is actually observed by the aerial vehicle, e.g., in real time or in near-real time, as inputs and may generate outputs corresponding to predicted vibrations based on the information or data.

In other implementations, the machine learning system 470 may reside and/or be operated on one or more centrally located computing devices or machines. The machine learning system 470 may receive information or data regarding the corpus of vibrations measured at joints or other locations on the body of each of the aerial vehicles 410-1, 410-2, 410-3, and 410-4 by the respective vibration sensors of each vibration control system for training purposes. Once the machine learning system 470 is trained, the machine learning system 470 may be used to program computing devices or machines of the aerial vehicles in a fleet with vibration models that predict vibrations at different vibration control systems during operation of the aerial vehicle, based on extrinsic or intrinsic information or data that is actually observed by the respective aerial vehicle. In still other implementations, the machine learning system 470 may be programmed to receive extrinsic or intrinsic information or data from operating aerial vehicles, e.g., via wireless means, as inputs. The machine learning system 470 may then generate outputs corresponding to predicted vibrations at different vibration control systems on the aerial vehicle based on the received information or data and return such predicted vibrations to the aerial vehicles. For example, the aerial vehicle and the machine learning system 470 may exchange batches of information that is collect over a period of time. For example, an aerial vehicle may measure extrinsic and/or intrinsic information or data for a period of three seconds (or any other period of time) and transmit that measured information or data to the machine learning system 470. The machine learning system, upon receiving the information or data, generates outputs corresponding to predicted vibrations at different vibration control systems on the aerial vehicle based on the received information or data and transmits those outputs to the aerial vehicle. The aerial vehicle may then use the received outputs to cause each vibration control system on the aerial vehicle to output the corresponding anti-vibration. This process may continue while the aerial vehicle is in-flight or operational.

For example, when variables such as an origin, a destination, a speed and/or a planned altitude for the aerial vehicle 410 (e.g., a transit plan for the aerial vehicle) are known, and where variables such as environmental conditions and operational characteristics may be known or estimated, such variables may be provided as inputs to the trained machine learning system 470. Subsequently, vibrations that may be predicted at each joint and/or vibration control system of the aerial vehicle 410 as the aerial vehicle 410 travels from the origin to the destination within such environmental conditions and according to such operational characteristics may be received from the trained machine learning system 470 as outputs. From such outputs, anti-vibrations, e.g., one or more vibrations that are substantially equal in intensity and opposite in phase to the predicted vibrations, may be determined in real time or near-real time as the aerial vehicle 410 is en route from the origin to the destination.

Figure 4C:
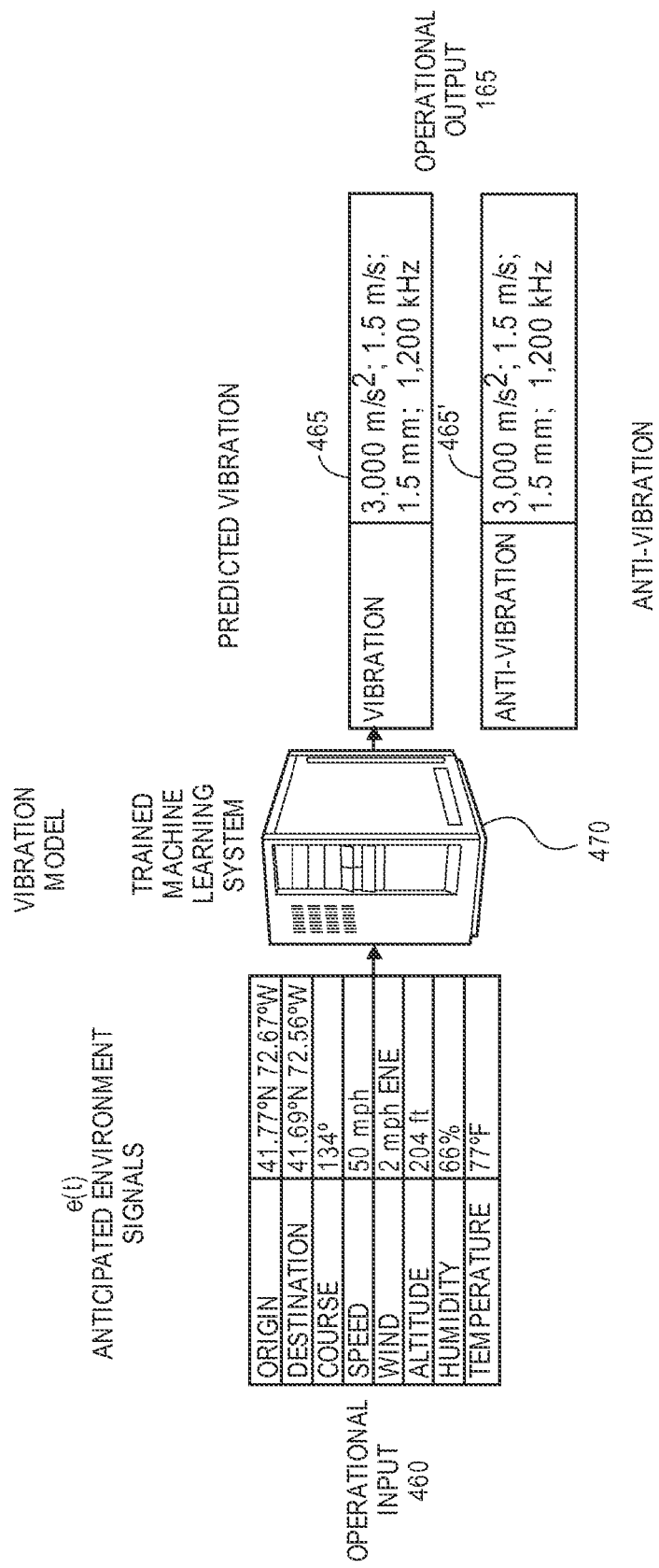

Referring to FIG. 4C, an operational input 460 in the form of environmental signals e(t) is provided to the trained machine learning system 470, and an operational output 465 in the form of predicted vibration is produced by the vibration model and received from the trained machine learning system 470. For example, the operational input 460 may include extrinsic or intrinsic information or data regarding a planned transit of an aerial vehicle (e.g., predicted environmental or operational conditions), or extrinsic or intrinsic information or data regarding an actual transit of the aerial vehicle (e.g., actually observed or determined environmental or operational conditions), including but not limited to coordinates of an origin, a destination, or of any intervening points, as well as a course and a speed of the aerial vehicle, a wind velocity in a vicinity of the origin, the destination or one or more of the intervening points, an altitude at which the aerial vehicle is expected to travel, and a humidity level and a temperature in a vicinity of the origin, the destination or one or more of the intervening points. The operational output 465 may include information regarding vibrations at various joints of the aerial vehicle that are expected to occur when the aerial vehicle operates in a manner consistent with the operational input 460, e.g., when the aerial vehicle travels along a similar course or speed, or at a similar altitude, or encounters a similar wind velocity, humidity level, or temperature.

Based at least in part on the operational output 465 that was determined based on the operational input 460, an anti-vibration 465', e.g., a vibration having a predetermined acceleration, velocity, displacement, and frequency that is one hundred eighty degrees out-of-phase with the operational output 465. In some implementations, the intensity of the anti-vibration 465' may be selected to completely cancel out or counteract the effects of the vibrations associated with the operational output 465, e.g., such that the intensity of the anti-vibration 465' equals the intensity of the predicted vibration during operation of the aerial vehicle 410, or of the vibrations that actually occur. Alternatively, in some implementations, the intensity of the anti-vibration 465' may be selected to otherwise modify or counteract the effects of vibrations associated with the operational output 465, e.g., such that the intensity of the anti-vibration 465' is less than the intensity of the predicted vibration. Moreover, where the operational output 465 identifies two or more vibrations that may be expected to occur at a mechanical vibration control system of the aerial vehicle based on the operational input 460, the anti-vibration 465' may include accelerations, velocities, displacements and frequencies of each of such vibrations, and each of such anti-vibrations may be output by the mechanical vibration control system during operation.

Those of ordinary skill in the pertinent arts will recognize that any type or form of machine learning system (e.g., hardware and/or software components or modules) may be utilized in accordance with the present disclosure. For example, a joint vibration may be associated with one or more of an environmental condition, an operating characteristic or a physical location or position of an aerial vehicle according to one or more machine learning algorithms or techniques, including but not limited to nearest neighbor methods or analyses, artificial neural networks, conditional random fields, factorization methods or techniques, K-means clustering analyses or techniques, similarity measures such as log likelihood similarities or cosine similarities, latent Dirichlet allocations or other topic models, or latent semantic analyses. Using any of the foregoing algorithms or techniques, or any other algorithms or techniques, a relative association between measured vibration and such environmental conditions, operating characteristics or locations of aerial vehicles may be determined.

In some implementations, a machine learning system may identify not only a predicted vibration but also a confidence interval, confidence level or other measure or metric of a probability or likelihood that the predicted vibration will occur at a joint or other location on the frame of the aerial vehicle in a given environment that is subject to given operational characteristics at a given position. Where the machine learning system is trained using a sufficiently large corpus of recorded environmental signals and vibrations, and a reliable vibration model is developed, the confidence interval associated with an anti-vibration identified thereby may be substantially high.

Although one variable that may be associated with vibrations occurring at various joints or other locations on a frame of an aerial vehicle is a position of the aerial vehicle (e.g., a latitude or longitude), and that extrinsic or intrinsic information or data associated with the position may be used to predict vibrations occurring at joints or other locations on the frame of the aerial vehicle at that position, those of ordinary skill in the pertinent arts will recognize that the systems and methods of the present disclosure are not so limited. Rather, vibrations may be predicted for areas or locations having similar environmental conditions or requiring aerial vehicles to exercise similar operational characteristics. For example, because environmental conditions in Vancouver, British Columbia, and in London, England, are known to be generally similar to one another, information or data gathered regarding the vibrations occurring at various joints or other locations on the frame of aerial vehicles operating in the Vancouver area may be used to predict vibrations that may occur at joints or other locations on the frame of aerial vehicles operating in the London area, or to generate anti-vibrations to be output at the joints or other locations on the frame of aerial vehicles operating in the London area. Likewise, information or data gathered regarding the vibrations occurring at joints or other locations on the frame of aerial vehicles operating in the London area may be used to predict vibrations occurring at joints or other locations on the frame of aerial vehicles operating in the Vancouver area, or to generate anti-vibrations to be output at joints or other locations on the frame of aerial vehicles operating in the Vancouver area.

In accordance with the present disclosure, a trained machine learning system may be used to develop vibration profiles for aerial vehicles based on their sizes, shapes, or configurations, and with respect to environmental conditions, operational characteristics, locations of vibration control systems on the aerial vehicles, and/or locations of such aerial vehicles. Based on such vibration profiles, anti-vibrations may be determined for vibration control systems located on such aerial vehicles as a function of the respective environmental conditions, operational characteristics or locations and output on an as-needed basis.

Figure 4D:
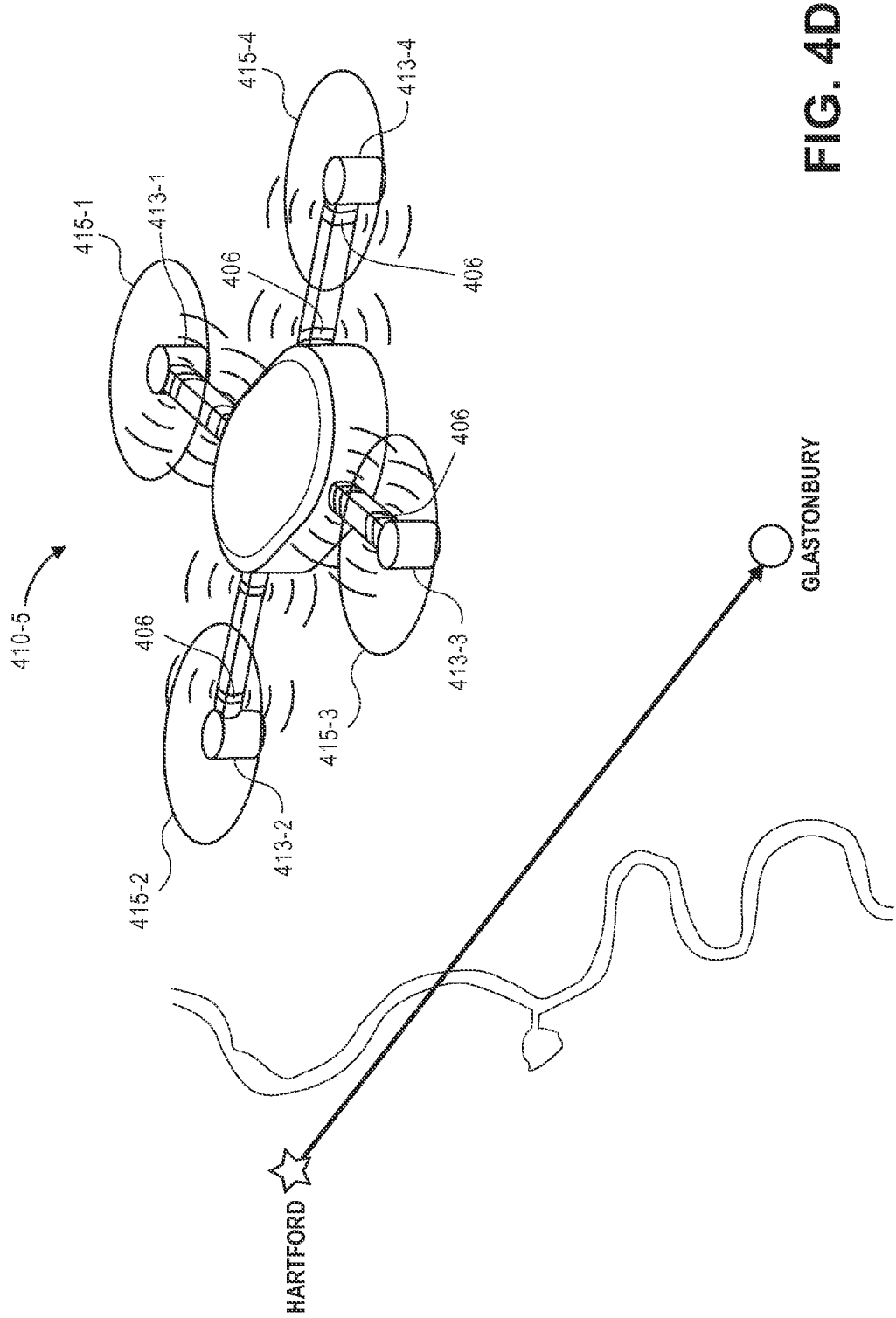

Referring to FIG. 4D, an aerial vehicle 410-5, including a plurality of rotors 413-1, 413-2, 413-3, 413-4 and a plurality of motors 415-1, 415-2, 415-3, 415-4 is shown en route from Hartford to Glastonbury, Conn. The aerial vehicle 410-5 is shown as vibrating at each joint. As will be appreciated, the vibration at each joint may be the same or different. To modify the vibration at each joint, an anti-vibration is output by the respective mechanical vibration control system 406 positioned at the joint. As discussed above, the anti-vibration may be determined based on actual vibration measurements determined by vibration sensors of respective vibration control systems at each joint of the aerial vehicle and/or the anti-vibrations may be predicted based on intrinsic or extrinsic information or data.

Figure 5:
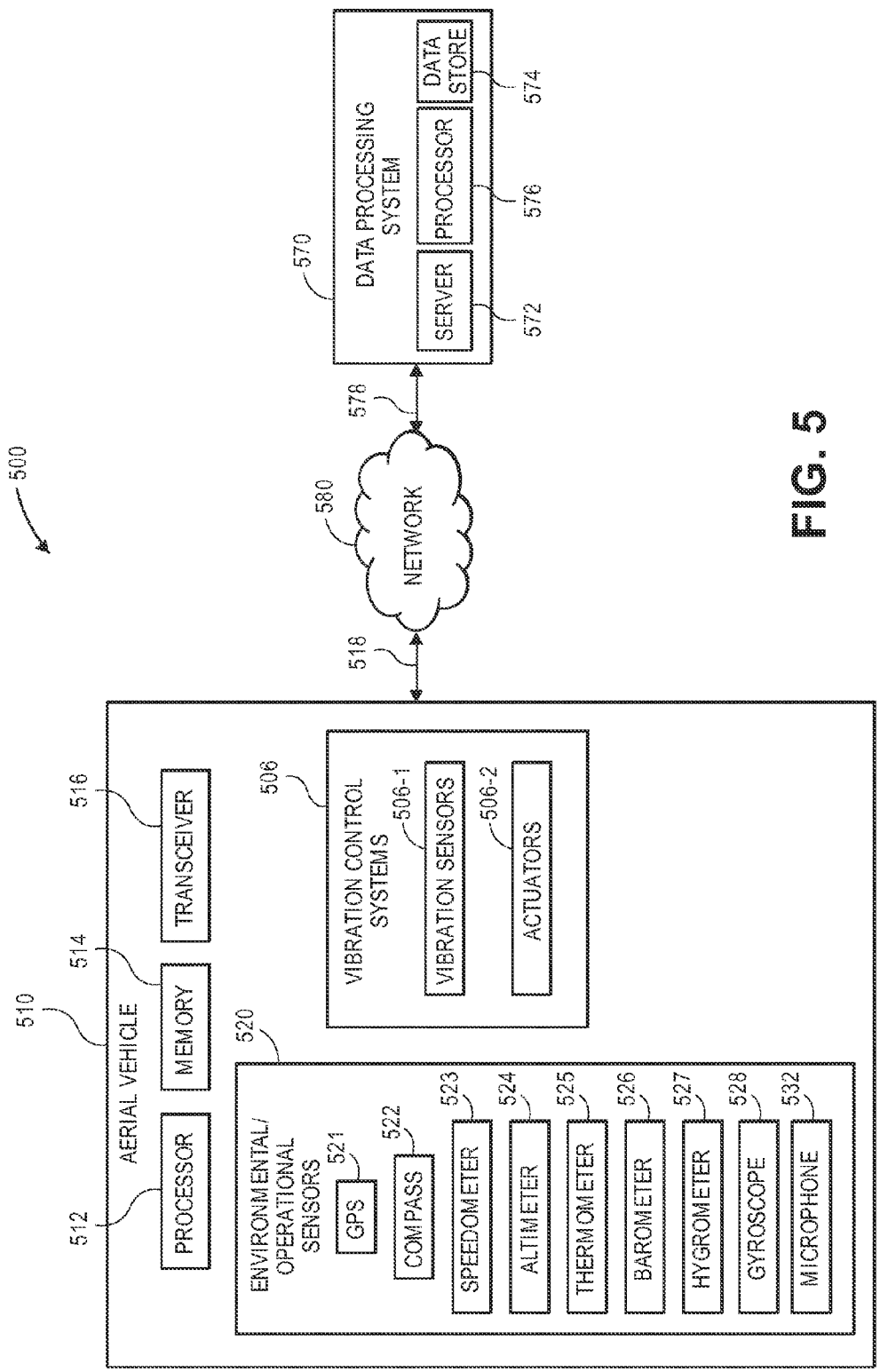
FIG. 5 is a block diagram of one system for active airborne mechanical vibration control, according to an implementation.

Referring to FIG. 5, illustrated is a block diagram of components of one system 500 for active airborne mechanical vibration control, in accordance with an implementation. The system 500 of FIG. 5 includes an aerial vehicle 510 and a data processing system 570 connected to one another over a network 580. Except where otherwise noted, reference numerals preceded by the number "5" shown in the block diagram of FIG. 5 indicate components or features that are similar to components or features having reference numerals preceded by the number "4" shown in the system 400 of FIGS. 4A through 4D.

The aerial vehicle 510 includes a processor 512, a memory 514 and a transceiver 516, as well as a plurality of environmental or operational sensors 520 and a plurality of vibration control systems 506. As discussed above, each vibration control system may include an actuator 506-2 and optionally a vibration sensor 506-1.

The processor 512 may be configured to perform any type or form of computing function, including but not limited to the execution of one or more machine learning algorithms or techniques. For example, the processor 512 may control any aspects of the operation of the aerial vehicle 510 and the one or more computer-based components thereon, including but not limited to the transceiver 516, the environmental or operational sensors 520, and/or the vibration control systems 506. The aerial vehicle 510 may likewise include one or more control systems (not shown) that may generate instructions for conducting operations thereof, e.g., for operating one or more rotors, motors, rudders, ailerons, flaps or other components provided thereon. Such control systems may be associated with one or more other computing devices or machines, and may communicate with the data processing system 570 or one or more other computer devices (not shown) over the network 580, through the sending and receiving of digital data. The aerial vehicle 510 further includes one or more memory or storage components 514 for storing any type of information or data, e.g., instructions for operating the aerial vehicle, or information or data captured by one or more of the environmental or operational sensors 520 and/or the vibration sensors 506-1.

The transceiver 516 may be configured to enable the aerial vehicle 510 to communicate through one or more wired or wireless means, e.g., wired technologies such as Universal Serial Bus (or "USB") or fiber optic cable, or standard wireless protocols, such as Bluetooth® or any Wireless Fidelity (or "Wi-Fi") protocol, such as over the network 580 or directly.

The environmental or operational sensors 520 may include any components or features for determining one or more attributes of an environment in which the aerial vehicle 510 is operating, or may be expected to operate, including extrinsic information or data or intrinsic information or data. As is shown in FIG. 5, the environmental or operational sensors 520 may include, but are not limited to, a Global Positioning System ("GPS") receiver or sensor 521, a compass 522, a speedometer 523, an altimeter 524, a thermometer 525, a barometer 526, a hygrometer 527, a gyroscope 528, and/or a microphone 532. The GPS sensor 521 may be any device, component, system or instrument adapted to receive signals (e.g., trilateration data or information) relating to a position of the aerial vehicle 510 from one or more GPS satellites of a GPS network (not shown). The compass 522 may be any device, component, system, or instrument adapted to determine one or more directions with respect to a frame of reference that is fixed with respect to the surface of the Earth (e.g., a pole thereof). The speedometer 523 may be any device, component, system, or instrument for determining a speed or velocity of the aerial vehicle 510, and may include related components (not shown) such as pitot tubes, accelerometers, or other features for determining speeds, velocities, or accelerations.

The altimeter 524 may be any device, component, system, or instrument for determining an altitude of the aerial vehicle 510, and may include any number of barometers, transmitters, receivers, range finders (e.g., laser or radar) or other features for determining heights. The thermometer 525, the barometer 526 and the hygrometer 527 may be any devices, components, systems, or instruments for determining local air temperatures, atmospheric pressures, or humidities within a vicinity of the aerial vehicle 510. The gyroscope 528 may be any mechanical or electrical device, component, system, or instrument for determining an orientation, e.g., the orientation of the aerial vehicle 510. For example, the gyroscope 528 may be a traditional mechanical gyroscope having at least a pair of gimbals and a flywheel or rotor. Alternatively, the gyroscope 528 may be an electrical component such as a dynamically tuned gyroscope, a fiber optic gyroscope, a hemispherical resonator gyroscope, a London moment gyroscope, a microelectromechanical sensor gyroscope, a ring laser gyroscope, or a vibrating structure gyroscope, or any other type or form of electrical component for determining an orientation of the aerial vehicle 510. The microphone 532 may be any type or form of transducer (e.g., a dynamic microphone, a condenser microphone, a ribbon microphone, a crystal microphone) configured to convert acoustic energy of any intensity and across any or all frequencies into one or more electrical signals, and may include any number of diaphragms, magnets, coils, plates, or other like features for detecting and recording such energy. The microphone 532 may also be provided as a discrete component, or in combination with one or more other components, e.g., an imaging device, such as a digital camera. Furthermore, the microphone 532 may be configured to detect and record acoustic energy from any and all directions.

Those of ordinary skill in the pertinent arts will recognize that the environmental or operational sensors 520 may include any type or form of device or component for determining an environmental condition within a vicinity of the aerial vehicle 510 in accordance with the present disclosure. For example, the environmental or operational sensors 520 may include one or more air monitoring sensors (e.g., oxygen, ozone, hydrogen, carbon monoxide or carbon dioxide sensors), infrared sensors, ozone monitors, pH sensors, magnetic anomaly detectors, metal detectors, radiation sensors (e.g., Geiger counters, neutron detectors, alpha detectors), altitude indicators, depth gauges, accelerometers or the like, as well as one or more imaging devices (e.g., digital cameras), and are not limited to the sensors 521, 522, 523, 524, 525, 526, 527, 528, 532 shown in FIG. 5.

The vibration sensors 506-1 and/or actuators 506-2 may be any type of device that is capable of detecting vibrations and/or generating a physical output (e.g., vibration). For example, the vibration sensors 506-1 and/or the actuators 506-2 may be piezoelectric accelerometers that are configured to convert changes in pressure to electrical signals or to convert electrical signals to output pressures, and may include one or more crystals, electrodes or other features. Alternatively, the vibration sensors 506-1 may include other forms of accelerometers, e.g., an application-specific integrated circuit and one or more microelectromechanical sensors in a land grid array package, that are configured to sense differential accelerations along one or more axes over predetermined periods of time and to associate such accelerations with levels of vibration.

The data processing system 570 includes one or more physical computer servers 572 having a plurality of data stores 574 associated therewith, as well as one or more computer processors 576 provided for any specific or general purpose. For example, the data processing system 570 of FIG. 5 may be independently provided for the exclusive purpose of receiving, analyzing or storing vibrations and/or other information or data received from the aerial vehicle 510 or, alternatively, provided in connection with one or more physical or virtual services configured to receive, analyze or store such vibrations, information or data, as well as one or more other functions. The servers 572 may be connected to or otherwise communicate with the data stores 574 and the processors 576. The data stores 574 may store any type of information or data, including but not limited to vibration information or data, and/or information or data regarding environmental conditions, operational characteristics, or positions, for any purpose. The servers 572 and/or the computer processors 576 may also connect to or otherwise communicate with the network 580, as indicated by line 578, through the sending and receiving of digital data. For example, the data processing system 570 may include any facilities, stations or locations having the ability or capacity to receive and store information or data, such as media files, in one or more data stores, e.g., media files received from the aerial vehicle 510, or from one another, or from one or more other external computer systems (not shown) via the network 580. In some implementations, the data processing system 570 may be provided in a physical location. In other such implementations, the data processing system 570 may be provided in one or more alternate or virtual locations, e.g., in a "cloud"-based environment. In still other implementations, the data processing system 570 may be provided onboard one or more aerial vehicles, including but not limited to the aerial vehicle 510.

The network 580 may be any wired network, wireless network, or combination thereof, and may comprise the Internet in whole or in part. In addition, the network 580 may be a personal area network, local area network, wide area network, cable network, satellite network, cellular telephone network, or combination thereof. The network 580 may also be a publicly accessible network of linked networks, possibly operated by various distinct parties, such as the Internet. In some implementations, the network 580 may be a private or semi-private network, such as a corporate or university intranet. The network 580 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and, thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/ output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The aerial vehicle 510 or the data processing system 570 may use any web-enabled or Internet applications or features, or any other client-server applications or features including E-mail or other messaging techniques, to connect to the network 580, or to communicate with one another, such as through short or multimedia messaging service (SMS or MMS) text messages. For example, the aerial vehicle 510 may be adapted to transmit information or data in the form of synchronous or asynchronous messages to the data processing system 570 or to any other computer device in real time or in near-real time, or in one or more offline processes, via the network 580. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the processor 512 or the processor 576, or any other computers or control systems utilized by the aerial vehicle 510 or the data processing system 570, and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or include signals that may be downloaded through the Internet or other networks.

Figure 6:
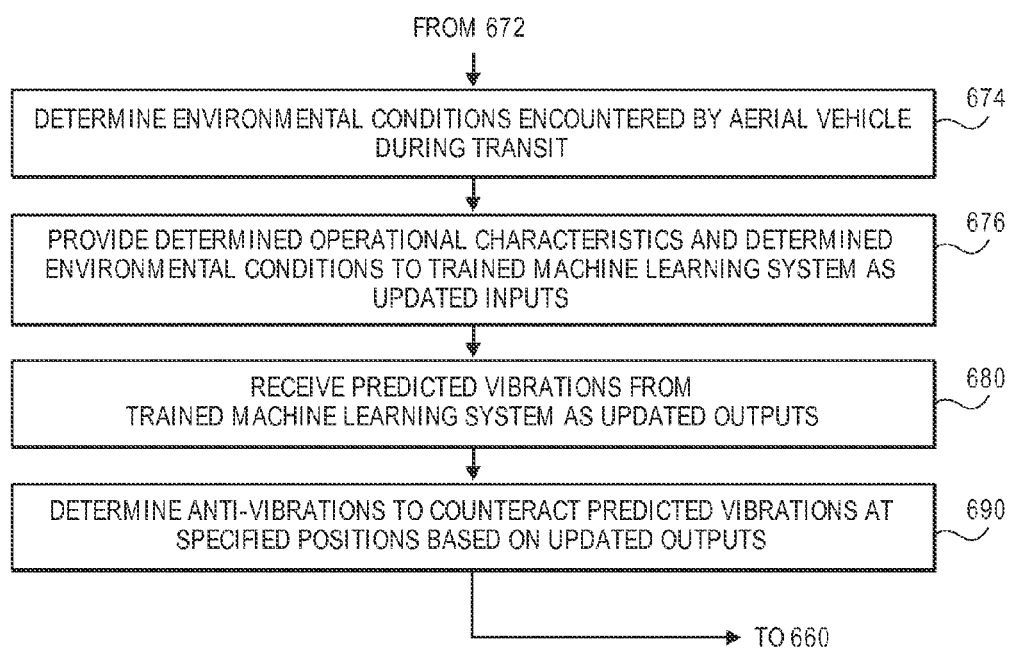
FIG. 6 is a flow diagram illustrating an example process for active airborne mechanical vibration control, according to an implementation.

FIG. 6 illustrates an example process 600 for active airborne mechanical vibration control, according to an implementation. The example process 600 begins by determining a destination of an aerial vehicle, as in 610. A transit plan may then be determined for transit of the aerial vehicle from an origin to the destination, as in 620. For example, the transit plan may specify an estimated time of departure from the origin, locations of any waypoints between the origin and the destination, a desired time of arrival at the destination, or any other relevant geographic or time constraints associated with the transit. Operational characteristics of the aerial vehicle that are required in order to complete the transit from the origin to the destination in accordance with the transit plan, e.g., courses or speeds of the aerial vehicle, and corresponding instructions to be provided to such motors, rotors, rudders, ailerons, flaps or other features of the aerial vehicle in order to achieve such courses or speeds, may be predicted, as in 622. Environmental conditions expected to be encountered during the transit from the origin to the destination in accordance with the transit plan may also be predicted, as in 624. For example, weather forecasts for the times or dates of the departure or the arrival of the aerial vehicle, and for the locations of the origin or the destination, may be identified on any basis.

The transit plan identified, the predicted operational characteristics, and the predicted environmental conditions are provided to a trained machine learning system as initial inputs, as in 626. The machine learning system may utilize one or more algorithms or techniques, such as nearest neighbor methods or analyses, factorization methods or techniques, K-means clustering analyses or techniques, similarity measures, such as log likelihood similarities or cosine similarities, latent Dirichlet allocations or other topic models, or latent semantic analyses, and may be trained to associate environmental, operational or location-based information with vibrations at the joints or other locations on the frame of the aerial vehicle. In some implementations, the trained machine learning system resides and/or operates on one or more computing devices or machines provided onboard the aerial vehicle. In some other implementations, the trained machine learning system resides in one or more alternate or virtual locations, e.g., in a "cloud"-based environment accessible via a network.

The predicted vibrations are received from the machine learning system as outputs for each respective mechanical vibration control system located at the joints or other locations on the frame of the aerial vehicle, as in 630. Such vibrations may be average or general vibrations anticipated at each mechanical vibration control system for the entire transit of the aerial vehicle from the origin to the destination in accordance with the transit plan, or may change or vary for each mechanical vibration control system based on the predicted location of the aerial vehicle, a time between the departure of the aerial vehicle from the origin and an arrival of the aerial vehicle at the destination, and/or based on the position of the mechanical vibration control system on the frame of the aerial vehicle. Alternatively, or additionally, the machine learning system may also determine a confidence interval, a confidence level or another measure or metric of a probability or likelihood that the predicted vibration for each mechanical vibration control system will occur in a given environment that is subject to given operational characteristics at a given position.

Based on the predicted vibrations, anti-vibrations intended to counteract the predicted vibrations at each mechanical vibration control system are determined, as in 640. The anti-vibration for each mechanical vibration control may be a continuous vibration output by a respective mechanical vibration control system when the aerial vehicle is within a vicinity of the given location in accordance with the transit plan, or may include different vibrations to be emitted at different times or intervals during the transit.

The aerial vehicle departs from the origin to the destination, as in 650, and each actuator of each mechanical vibration control system of the aerial vehicle outputs the respective anti-vibration at specific positions during the transit from the origin to the destination. For example, the aerial vehicle may monitor its position during the transit using one or more GPS receivers or sensors and send instructions or provide position information to each mechanical vibration control system. In response, each mechanical vibration control system will, if instructed, output the respective anti-vibration, or determine, if receiving position information, whether an anti-vibration is to be output. A determination is then made as to whether the aerial vehicle has arrived at the destination, as in 670. If the aerial vehicle has arrived at the destination, the example process completes.

If the aerial vehicle has not yet arrived at the destination, however, then the example process determines the actual operational characteristics of the aerial vehicle during the transit, as in 672. For example, information or data regarding the actual courses or speeds of the aerial vehicle, and the operational actions, events or instructions that caused the aerial vehicle to achieve such courses or speeds, may be captured and recorded in at least one data store, which may be provided onboard the aerial vehicle, or in one or more alternate or virtual locations, e.g., in a cloud-based environment accessible via a network. Environmental conditions encountered by the aerial vehicle during the transit are also determined, as in 674. For example, information or data regarding the actual wind velocities, humidity levels, temperatures, precipitation or any other environmental events or statuses within the vicinity of the aerial vehicle may also be captured and recorded in at least one data store.

The information or data regarding the determined operational characteristics and environmental conditions are provided to the trained machine learning system as updated inputs, in real time or in near-real time, as in 676. In some implementations, values corresponding to the operational characteristics or environmental conditions are provided to the trained machine learning system. In some other implementations, values corresponding to differences or differentials between the determined operational characteristics or the determined environmental conditions and the predicted operational characteristics or the predicted environmental conditions may be provided to the trained machine learning system.

Based on the determined operational characteristics and/or determined environmental conditions, predicted vibrations for each mechanical vibration control are received from the trained machine learning system as updated outputs, as in 680. As discussed above, vibrations predicted to occur at each mechanical vibration control system may be predicted in accordance with a transit plan for the aerial vehicle, and anti-vibrations determined based on such predicted vibrations may be determined based on the transit plan, as well as any other relevant information or data regarding the transit plan, including attributes of an origin, a destination or any intervening waypoints, such as locations, topography, population densities or other criteria. Anti-vibrations for counteracting the predicted vibrations received from the trained machine learning system based on the updated outputs are determined before the process returns to box 660, where such anti-vibrations are emitted at specified positions by each of the mechanical vibration control systems, as in 690.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, although some of the implementations disclosed herein reference the use of unmanned aerial vehicles to deliver payloads from warehouses or other like facilities to customers, those of ordinary skill in the pertinent arts will recognize that the systems and methods disclosed herein are not so limited, and may be utilized in connection with any type or form of aerial vehicle (e.g., manned or unmanned) having fixed or rotating wings for any intended industrial, commercial, recreational or other use.

Moreover, although some of the implementations disclosed herein depict the use of aerial vehicles having sensors for detecting vibrations, environmental conditions, operational characteristics and positions, and actuators for outputting anti-vibrations, the systems and methods of the present disclosure are likewise not so limited. For example, a first aerial vehicle may feature sensors for detecting vibrations, environmental conditions, operational characteristics and positions, and provide information or data regarding such vibrations, environmental conditions, operational characteristics or positions to a machine learning system, which may be trained to associate such environmental conditions, operational characteristics or positions with vibrations. Subsequently, information or data regarding a transit of a second aerial vehicle may be provided as an input to the machine learning system and anti-vibrations to be output by each vibration control system of the second aerial vehicle may be determined based on outputs from the machine learning system.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Disjunctive language, such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially," as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. An unmanned aerial vehicle (UAV) comprising:
    a frame, including:
        a first motor arm coupled to the frame and forming a first joint; and
        a second motor arm coupled to the frame and forming a second joint;
    a first motor coupled to the first motor arm and forming a third joint;
    a second motor coupled to the second motor arm and forming a fourth joint;
    a first mechanical vibration control system, including:
        a first sensor positioned at the first joint to measure a first mechanical vibration occurring at the first joint;
        a first processor in communication with the first sensor to receive the measured first mechanical vibration and generate a first anti-vibration; and
        a first actuator positioned at the first joint and in communication with the first processor, the first actuator to output the first anti-vibration such that the first anti-vibration reduces the first mechanical vibration at the first joint; and
        wherein the first actuator is configured to operate in a first mode as the first sensor to measure the first mechanical vibration, and the first actuator is configured to operate in a second mode to output the first anti-vibration; and
    a second mechanical vibration control system, including:
        a second sensor positioned at the second joint to measure a second mechanical vibration occurring at the second joint;
        a second processor in communication with the second sensor to receive the measured second mechanical vibration and generate a second anti-vibration; and
        a second actuator positioned at the second joint and in communication with the second processor, the second actuator to output the second anti-vibration such that the second anti-vibration reduces the second mechanical vibration at the second joint; and wherein the second actuator is configured to operate in a third mode as the second sensor to measure the second mechanical vibration, and the second actuator is configured to operate in a fourth mode to output the second anti-vibration.

2. The UAV of claim 1, further comprising:

a third mechanical vibration control system, including:
   a third sensor positioned at the third joint to measure a third mechanical vibration occurring at the third joint; and
   a third actuator positioned at the third joint, the third actuator to output a third anti-vibration such that the third anti-vibration reduces the third mechanical vibration at the third joint.

3. The UAV of claim 2, wherein:

the third sensor communicates with the first processor to provide the measured third mechanical vibration to the first processor; and the first processor generates the third anti-vibration and sends the third anti-vibration to the third actuator.

4. The UAV of claim 1, wherein the first actuator is configured in a feedback control mode in which the first actuator is configured to operate in the first mode to measure a result of the first mechanical vibration when combined with the first anti-vibration, and the first actuator is configured to operate in the second mode based at least in part on the result.

5. A method to operate an aerial vehicle, the method comprising:

determining a first mechanical vibration at a first location on the aerial vehicle;

generating a first anti-vibration based at least in part on the first mechanical vibration; and outputting by a first actuator positioned proximate to the first location, the first anti-vibration such that the first anti-vibration modifies the first mechanical vibration;

wherein determining the first mechanical vibration includes operating the first actuator in a first mode in which the first actuator measures the first mechanical vibration; and wherein outputting the first anti-vibration includes operating the first actuator in a second mode in which the first actuator outputs the first anti-vibration.

6. The method of claim 5, wherein generating the first anti-vibration includes:

providing information regarding the first mechanical vibration to at least one processor, the information including at least one of a first acceleration of the first mechanical vibration, a first velocity of the first mechanical vibration, a first displacement of the first mechanical vibration, or a first frequency of the first mechanical vibration; and receiving, from the at least one processor, information regarding the first anti-vibration, wherein the information regarding the first anti-vibration includes at least one of a second acceleration of the first anti-vibration, a second velocity of the first anti-vibration, a second displacement of the first anti-vibration, or a second frequency of the first anti-vibration; and wherein the second frequency is equal in magnitude and of reverse polarity with respect to the first frequency.

7. The method of claim 5, wherein determining the first mechanical vibration includes measuring the first mechanical vibration using the first actuator in the first mode as a first sensor positioned at the first location on the aerial vehicle.

8. The method of claim 5, wherein the first anti-vibration is generated without regard to the output from the first actuator.

9. The method of claim 5, wherein the first anti-vibration is generated based at least in part on a net effect of a combination of the first mechanical vibration and the first anti-vibration.

10. The method of claim 5, further comprising:

determining information regarding a transit plan for the aerial vehicle, wherein the transit plan comprises information regarding at least one of a plurality of positions of the aerial vehicle, environmental conditions anticipated for the aerial vehicle, or operational conditions anticipated for the aerial vehicle; and wherein determining the first mechanical vibration is based on the transit plan.

11. The method of claim 10, further comprising:

determining a second mechanical vibration at a second location on the aerial vehicle, wherein the second mechanical vibration is determined based at least in part on the transit plan;

generating a second anti-vibration based at least in part on the second mechanical vibration; and outputting by a second actuator positioned at the second location, the second anti-vibration such that the second anti-vibration modifies the second mechanical vibration.

12. The method of claim 5, further comprising:

determining a second mechanical vibration at a second location on the aerial vehicle, wherein the second mechanical vibration is measured by a sensor positioned at the second location;

generating a second anti-vibration based at least in part on the second mechanical vibration; and outputting by a second actuator positioned proximate to the second location, the second anti-vibration such that the second anti-vibration modifies the second mechanical vibration.

13. The method of claim 5, further comprising:

measuring an environmental condition during an operation of the aerial vehicle;

measuring an operational condition during the operation of the aerial vehicle; and correlating the first mechanical vibration with at least one of the environmental condition or the operational condition.

14. The method of claim 13, wherein the environmental condition is at least one of a temperature, a barometric pressure, a wind speed, a humidity, a level of cloud coverage, a level of sunshine, a surface condition, a time of day, a time of year, a phase of a moon, a tide of the ocean, a direction of a earth's magnetic field, a pollution level, or a particulates count.

15. The method of claim 13, wherein the operational characteristic is at least one of a rotating speed of a motor provided on the aerial vehicle, an altitude of the aerial vehicle, a course of the aerial vehicle, an airspeed of the aerial vehicle, a climb rate of the aerial vehicle, a descent rate of the aerial vehicle, a turn rate of the aerial vehicle, or an acceleration of the aerial vehicle.

16. An aerial vehicle, comprising:

a frame;

a first motor coupled to the frame;

a first propeller coupled to the first motor;

a first mechanical vibration control system at a first location on the frame, the first mechanical vibration control system to output a first anti-vibration at the first location such that the first anti-vibration modifies a first mechanical vibration at the first location, wherein the first mechanical vibration control system includes a piezoelectric accelerometer to both measure the first mechanical vibration and output the first anti-vibration; and a second mechanical vibration control system at a second location on the frame, the second mechanical vibration control system to output a second anti-vibration at the second location such that the second anti-vibration modifies a second mechanical vibration at the second location.

17. The aerial vehicle of claim 16, wherein the piezoelectric accelerometer operates in a second mode as an actuator to output the first anti-vibration.

18. The aerial vehicle of claim 16, wherein the piezoelectric accelerometer operates in a first mode as a sensor to measure the first mechanical vibration.

19. The aerial vehicle of claim 16, wherein the first mechanical vibration and the second mechanical vibration are generated based at least in part on a rotation of the first motor or a rotation of the first propeller.

* * * * *